(12) United States Patent
Sperger

(10) Patent No.: US 6,799,938 B2
(45) Date of Patent: Oct. 5, 2004

(54) COMMISSIONING DEVICE WITH VERTICAL PRODUCT STORAGE UNITS AND LOWER CONVEYOR BELT OR SIMILAR

(75) Inventor: Karl Freudel Sperger, Hart bei Graz (AT)

(73) Assignee: Knapp Logistik Automation GmbH, Hart bei Graz (AT)

( * ) Notice: Subject to any disclaimer, the term of this patent is extended or adjusted under 35 U.S.C. 154(b) by 48 days.

(21) Appl. No.: 10/220,028
(22) PCT Filed: Feb. 26, 2001
(86) PCT No.: PCT/EP01/02174
§ 371 (c)(1), (2), (4) Date: Aug. 22, 2002
(87) PCT Pub. No.: WO01/64557
PCT Pub. Date: Sep. 7, 2001

(65) Prior Publication Data
US 2003/0012637 A1 Jan. 16, 2003

(30) Foreign Application Priority Data
Feb. 29, 2000 (DE) .......................................... 100 09 560

(51) Int. Cl.[7] .......................... B65G 59/06; B65H 3/00; B65H 3/24
(52) U.S. Cl. ................................ 414/797.4; 414/797.6; 414/797.9
(58) Field of Search .......................... 414/797.4, 797.6, 414/797.9; 198/728, 729, 732, 468.11, 479.1

(56) References Cited
U.S. PATENT DOCUMENTS
2,780,342 A 2/1957 Good 5,370,495 A * 12/1994 Montalvo et al. ........ 414/797.9
5,573,368 A * 11/1996 Freudelsperger ......... 414/795.8

FOREIGN PATENT DOCUMENTS
| DE | 93 09 881 | 6/1994 |
| DE | 200 03 757 | 9/2000 |
| EP | 0 265 749 | 5/1988 |
| EP | 0 960 836 | 12/1999 |

OTHER PUBLICATIONS

Fukumoto Muneharu Jul. 2, 1986 Patent Abstracts of Japan 61145047 Copyright: (C) 1986, JPO & Japio.

* cited by examiner

Primary Examiner—Gene O. Crawford
(74) Attorney, Agent, or Firm—McGlew & Tuttle, P.C.

(57) ABSTRACT

A commissioning device (1) has essentially vertical product storage units (2) in which products (3) of the same type are stacked, respectively, and at least one conveying means (4), especially a conveyor belt, which is located underneath the product storage units, for transporting outgoing selected or commissioned products. The product (3') at the very bottom of the stack of a selected product storage unit can be pushed out of the product storage unit in the direction of travel (F) of the moving conveying device and placed in a positioned product field (6) of the conveyor device by an upwardly oriented product stopping device (5) of the conveying device. The product storage units (2) are preferably located at equal intervals above the level of the conveying device (7). If the bottom product (3') in a stack is not commissioned, the product stops (5) of the moving conveying device (4) pass freely under the product storage unit (2). If the product is commissioned, that product stops are raised by lifting device (8) in order to engage laterally with at least one product (3') at the bottom of the stack.

17 Claims, 9 Drawing Sheets

COMMISSIONING DEVICE WITH VERTICAL PRODUCT STORAGE UNITS AND LOWER CONVEYOR BELT OR SIMILAR

FIELD OF THE INVENTION

The present invention pertains to a commissioning device with essentially vertical product storage units, in which products of the same type are stacked, and with at least one conveying means arranged under the product storage units, especially a conveyor belt, for the removal of selected or commissioned products, wherein the product of a selected product storage unit, which product is the lowermost product of the stack, can be pushed out of the product storage unit by an upwardly directed product stop of the conveying means in the direction of conveying of the moving conveying means and can be deposited on a positioned product field of the conveying means.

BACKGROUND OF THE INVENTION

A commissioning device of the above-mentioned type has been known from EP 0 960 836 A2. The lowermost product of the stack is removed by the product storage unit being lowered with a continuously driven conveyor belt, which has product stops arranged at spaced locations from one another at the top, to the extent that the product stop or stud moving by carries with it the lowermost product of the column. The drawback of this embodiment is that the weight of the entire product column must be moved to push out a product, which leads to a complicated guide mechanism.

SUMMARY OF THE INVENTION

The object of the present invention is to provide a commissioning device of the type mentioned in the introduction, which makes possible the reliable and efficient commissioning of at least the lowermost products of stacks of a selected product storage unit by means of simple measures.

The essence of the present invention is that the product storage units are arranged lying above the plane of the conveying means, preferably at equally spaced locations from the said plane, and the product stop of the moving conveying means passes through freely under the product storage unit in case of non-commissioning of the lowermost product of the stack and is raised by a lifting means for a lateral engagement with at least one lowermost product of the stack in case of commissioning. Consequently, the entire product storage unit with its full weight is not moved in the direction of the conveyor belt or the product stop to push the product that is the lowermost product of the stack out of the product storage unit, as is done according to the state of the art, but the product stop of the moving conveying means is briefly raised. The product stop can be raised with or without the conveying means. The moving masses are always small, which makes possible a rapid cycling and consequently rapid and reliable commissioning. The moving conveying means may be a conveyor belt, a link conveyor, two toothed belts, V-belts or chains. The advantages of the system according to the present invention are the mechanical simplicity and especially the fact that due to the products being carried with the stop or stud, the products come to lie on the conveying means in an accurately positioned manner, which is favorable, e.g., for automatic labeling. It is also possible to form stacks of products on the conveying means between two adjacent product stops located at spaced locations from one another without an additional effort.

Provisions are made, in particular, for the conveying means to be raised by the lifting means together with the product stop rigidly connected to the conveying means directly in front of and after the product of a product storage unit, which is the lowermost product of the stack, and to be lowered again into the plane of the conveying means after pushing out.

The lifting means are preferably a cycled, vertical lifting drive, which is provided under the conveying means in the area of an associated product storage unit and is operated especially pneumatically or electrically.

The lifting means may also include an oblique stationary ramp with a wedge-shaped lifting body and be provided under the conveying means in the area of an associated product storage unit, the lifting body, which is displaceable or can be moved by means of rollers, being able to be adjusted in height along the ramp.

As an alternative, the conveying means may be, in principle, longitudinally movable, but not adjustable in height, and the pushing out of a product that is the lowermost product of the stack may also be pushed out of the selected product storage unit by the product stop connected to the conveying means being raised by lifting means without the conveying means directly in front of and after the product of a product storage unit, which product is the lowermost product of the stack and is to be commissioned, and being again lowered into the plane of the conveying means after pushing it out.

The product stop is preferably connected in this case to the conveying means by means of a conveying means tab, which is subjected to tensile load, and the product stop is adjustable in height by means of literal stationary ramps in the area of the lateral edge of the conveying means or by a means arranged above the conveying means at the product storage unit when commissioning is to be performed.

The lateral ramps advantageously have an adjustable, cycled switch each, which is preferably a laterally displaceable part of the ramp. If the switch is inactive, a transverse connecting rod of the product stop can be moved in the direction of conveying in a lateral longitudinal groove of the lateral ramps at the same level as the conveying means. If the switch is set, the longitudinal groove is blocked by slides, the transverse connecting rod passes through a predetermined elevated path corresponding to the preset ascent of the ramp, the saddle of the ramp and the decline of the ramp and consequently also corresponding to the product stop, which will then laterally engage a lowermost product of the stack and pushes out this product in the course of its forward movement and positions same on the product field in front of the product stop on the conveying means.

Instead of a preferably central product stop, two lateral product stops of identical design may also be provided for a single product of a product storage unit, which is the lowermost product of the stack, in order to reliably prevent jamming from occurring during the pushing out in all cases.

The product storage units may be preferably slightly sloped relative to the vertical in the direction of conveying of the conveying means. The pushing-out operation is facilitated by the slope.

The product storage units of a conveying means may be arranged in a row and spaced equally from one another.

In particular, the distance between the product storage units is smaller than the width of the product storage unit in order to ensure the compact design of the overall system. The distance between two product storage units can be bridged over by a protective plate in order to minimize the risk for injury to a user. A high product stop moving forward may possibly represent a safety hazard.

The product storage units may also be sloped, preferably slightly, relative to the vertical at right angles to the direction of conveying of the conveying means.

Provisions may be made, in particular, for the product storage unit to be a vertical, doubly sloped angle sheet iron with a positioning angle for products picked up in the product storage unit. Differently configured cubic objects can also be stacked in an aligned manner in such a storage unit and handled and especially ejected correspondingly reliably.

The product storage units may have a lateral ejection slot located in the direction of conveying for products to be given out, where the width of the slot is selected or the slot can be adjusted in width in the vertical direction such that two or more stacked products can be deposited simultaneously as a small stack of products on a single product field of the conveying means. It is obvious that the height of the product stop must be selected correspondingly in this case. A product stop may be optionally moved in height on two different lateral ramps or on a single lateral ramp, which ramp will now have two switches of different heights.

In particular, an ejection slot that is broad in the vertical direction may be formed in the product storage unit, which has a maximum vertical extension for pushing out, e.g., two or three products at the same time, with a brush being fastened horizontally in the upper horizontal edge area of the ejection slot such that the bristles of the brush extend downward and end under the top edge of the product of the product storage unit, which product is the lowermost product in the stack, and a product falling after is reliably retained. If only the product that is the lowermost product of the stack is commissioned in the case of such a design, this product can be pushed out practically freely with the product stop touching the bristles only slightly. If two (or three) products are being commissioned, and the raised product stop has a correspondingly high engagement position, the second lowest (or possibly also the third lowest) product of the product stack is also pushed out of the product storage unit together with the lowermost product of the stack. The elastic bristles of the brush are correspondingly deflected in this case by the second lowest (and possibly the third lowest) product during pushing out. It is obvious that another elastic member, e.g., leaf spring tongues, which performs the same function, may also be provided instead of the brush.

Instead of the brush or the elastic member, it is also possible to provide a plate slide, which releases the entire vertical width of the ejection slot in a raised position, so that, e.g., two or three products can be pushed out simultaneously. If only the lowermost product of the stack is to be pushed out or commissioned, the height-adjustable slide is correspondingly lowered in order to release only the width [necessary] for the lowermost product of the stack. The plate slide is correspondingly actuated now by an electronic control means, which is part of the electronic control unit of the commissioning device, just as the product stop for its height adjustment.

The overall system of a commissioning device may have different designs depending on the capacity, the intended use and the local conditions. In particular, a plurality of conveying means with associated product storage units may be provided in the same plane and/or in different planes, whose conveying end is in connection with a cross belt or the like, and oblique intermediate conveyor belts or the like, which can be bridged over in height, may be provided.

A plurality of pushed-out products, which have been taken from one or more product storage units, may be preferably stacked in a single product field.

One or more product storage units may be designed as drawers or as roller-mounted drawers displaceable at right angles to the conveyor belt. The product storage unit is now pulled out laterally for filling. The position of the drawer is scanned by means of a sensor or scanner. Pushing out is prevented by the product storage unit control for the time of refilling. If a product is needed from the blocked product storage unit during this time, the product storage unit control reports the error or the refilling operation to the control computer.

The drawer may have a plurality of product storage units next to one another (parallel channels). The unused product storage units can be filled during the operation. A full product storage unit is then brought into the push-out position by displacing the drawer, and the empty product storage unit can again be refilled. The pushing out must be prevented in this case only for the duration of the channel change. The product storage unit can be correspondingly enlarged at equal overall height by the automatic or manual pushing on of a drawer with a plurality of parallel, channels.

Consequently, a stack of products (product column) is present according to the present invention in the product storage unit. The product storage units are always arranged vertically or sloped (at right angles to the direction of conveying) above a lifting device located under the conveyor belt).

The studs or product stops have such a height that they can pass through under the magazines with the lifting device withdrawn and the belt moving. If a product is to be removed, the conveyor belt is raised with the belt moving at the moment at which a stud is located directly in front of the front edge of the product storage unit. The conveyor belt is raised to the extent that the stud carries the lowermost product of the product column in the direction of conveying and as a result pushes it out of the product storage unit. The pushed-out product will then be located on the conveyor belt in a discrete field, whose size is determined by the distance between the studs.

A plurality of products can be pushed out of different product storage units with the same studs. As a result, a product stack is formed, which can be taken over at the end of the conveyor belt.

The advantages of the system are the mechanical simplicity and the fact that due to the products being carried with the studs, the products lie on the belt in an accurately positioned manner (which is favorable, e.g., for automatic labeling), and product stacks can be formed without an additional effort.

Especially in the area of E-commerce, where an order consists, in general, of a small number of products only, a complete order requires only one product window if the height of the stack does not exceed the height of the stud. A drastic increase in the throughput of the system is achieved as a result.

The raising of the conveyor belt, or the like can be accomplished in many ways. One possibility is to push a plastic wedge over a ramp recessed in the material handling equipment. Any method for generating a lifting movement is possible, in principle (lifting magnet, vertically installed cylinder with roller, lateral cylinder with lifting mechanism, etc.).

Control:

The control computer receives an order consisting of a plurality of products. If the height of the stack is smaller than the height of the stud, the entire order can be stacked into a discrete field (product window=distance between two studs). If an order requires a plurality of product windows, the order is split. Due to the arrangement of the product storage units with lifting mechanism above the materials handling equipment, each storage unit has a defined three-dimensional distance from the end (in the direction of conveying) of the materials handling equipment. A pulse generator coupled with the materials handling equipment provides the information on the position of the product window. The product windows needed for an order are first reserved. If the product window is then located under a product storage unit, from which a product is to be pushed out, the corresponding lifting mechanism is activated.

To save space, a plurality of planes are connected one over another and/or by a curve and/or are arranged one behind the other, but also next to one another. To again reach a product window after a curve, the velocity of the conveyor belts of this plane must be equal, and the phase position of the product windows of the plane must remain constant to one another, i.e., it must be able to be configured. Finally, all the planes located one on top of another and one behind the other and optionally also next to one another are brought together onto one section. To reach the product windows of the collecting belt during this operation, the velocity and the phase position of the converging sections must also be constant or able to be configured. The belt synchronization control is necessary only in the case of curves and to optimize the throughput.

As an alternative, the raising of the stud may also take place according to another principle. Instead of raising the conveyor belt, a conveyor belt or the like with a tab, strip, small plate or the like, arranged on the conveying side, may be used. The tabs or the like are fastened at the conveyor belt at right angles to the direction of conveying and have a stud at the loose end, which stud acts as a push-out means. Together with the stud, a rod, which projects over the lateral edge of the conveyor belt, is mounted at right angles to the direction of conveying. A ramp with a switch is located under each product storage unit on both sides next to the conveyor belt. If a product is to be pushed out, the switch is activated as soon as the tab belonging to the product window is located under the product storage unit. The product storage units are sloped in the direction of conveying. In addition, the product storage units may also be sloped at right angles to the direction of conveying in order to make possible the simple filling of the product storage unit, because the products are automatically in contact with the rear side due to the force of gravity, and the front side (seen at right angles to the direction of conveying) can be left open. The rod at the end of the tab runs up onto the ramp and is raised as a result. After overcoming the ascent, there is a gradient, which corresponds to the slope of the product storage unit. The knob raised by the rod now carries the lowermost product with it out of the product storage unit. The slope of the product storage unit is selected to be such that the pushed-out product can be pushed under the next channel. As a result, the distance between consecutive product storage units can be minimized. If the switch is not activated, the rod passes through under the ramp along a groove.

A combination of the two possibilities is also conceivable: A higher stud with a rod at right angles to the direction of conveying is raised over a ramp only to the extent that the top edge of the stud pushes the lowermost product out of the product storage unit. The possibility of forming stacks is thus preserved. However, the ramp may also be part of the product storage unit, and projections on the stud are used to raise the stud.

Overall system:

The system may comprise a plurality of planes located one on top of another and rows located next to one another. A container handling equipment is arranged at right angles to the rows. The products are transferred at the end of the materials handling equipment either directly in each plane into containers waiting in front of it, or the planes are converged onto one level with transfer of the products into containers in one level.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
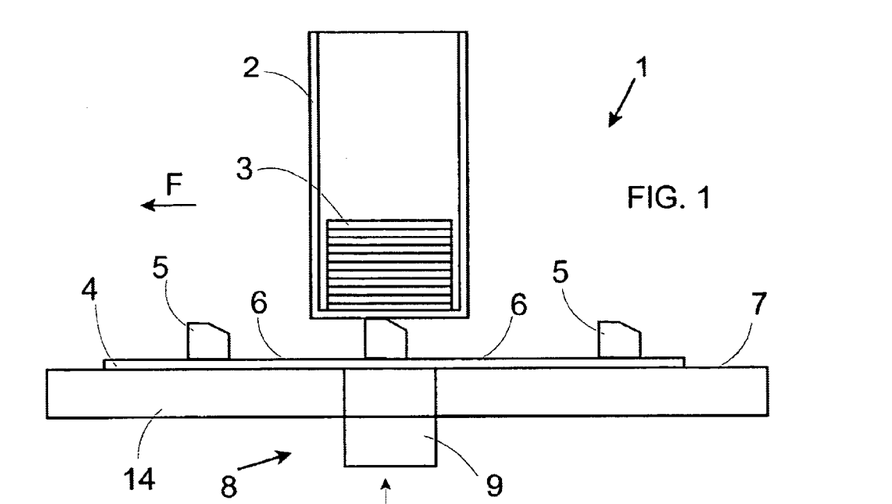
FIG. 1 is a schematic view of a commissioning device according to the present invention with product storage unit, conveyor belt and product stop in the non-activated state or during non-commissioning.
Figure 2:
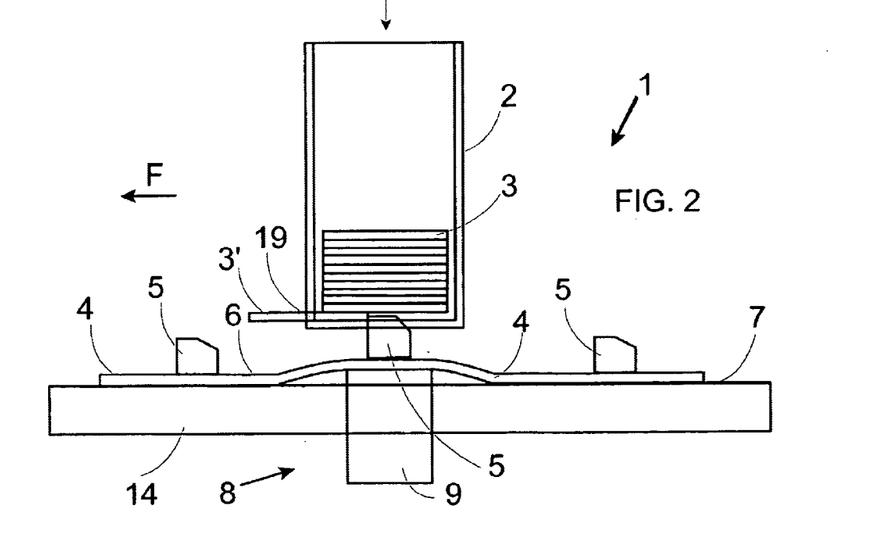
FIG. 2 is a schematic view of a commissioning device according to FIG. 1 during commissioning.

Referring to the drawings in particular, according to FIGS. 1 and 2, a commissioning device 1 comprises vertical product storage units 2 (only one product storage unit is illustrated for the sake of clarity), in which products 3 of the same type are stacked.

The product storage units 2 are mounted rigidly in the commissioning device and are arranged in a row along a conveying means in the form of a conveyor belt 4 at equally spaced locations, and the conveyor belt 4 itself, which is intended to remove selected or commissioned products 3, is located at an equal distance under the product storage units 2.

In particular, the respective product 3' of a selected product storage unit, which product is the lowermost product of the stack, can be pushed by an upwardly directed product stop 5 of the conveyor belt 4 out of the product storage unit in the direction of conveying F of the moving conveyor belt and deposited on a positioned product field 6 of the conveyor belt in front of the product stop 5, especially by the product stop 5 of the moving conveyor belt 4 being raised during the commission of a product 3' that is the lowermost product of the stack by lifting means 8 for a lateral engagement with at least one product 3' that is the lowermost product of the stack and by subsequently acting as a carrier. If the product storage unit is not to be activated or commissioned during a run of the product stop 5, the product stop passes through freely under the product storage unit 2 without raising the conveyor belt plane 7. The moving conveyor belt is supported on a stationary sliding support 14.

The lifting means 8 are arranged such that the conveyor belt 4 is raised together with the product stop 5 rigidly connected to the conveyor belt directly in front of the product 3' of a product storage unit, which is the lowermost product of the stack and is to be commissioned, then held at a constant level and lowered again into the conveyor belt plane 7 after the ejection of the lowermost product 3' of the stack, as is apparent especially from FIG. 2 compared with FIG. 1, in which the product stop passes through inactively under the product storage unit 2 located at a spaced location.

The lifting means according to FIGS. 1 and 2 are a cycled, vertical lifting drive 9, which is provided under the conveyor belt 4 in the area of an associated product storage unit 2 and is preferably operated pneumatically or electrically.

Figure 3:
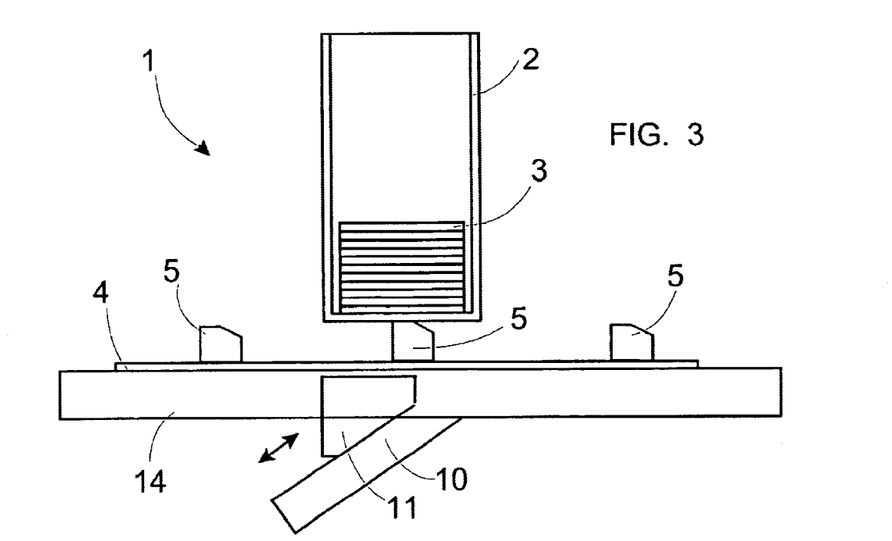
FIG. 3 is schematic view showing another commissioning device during noncommissioning in a view similar to that in FIG. 1.
Figure 4:
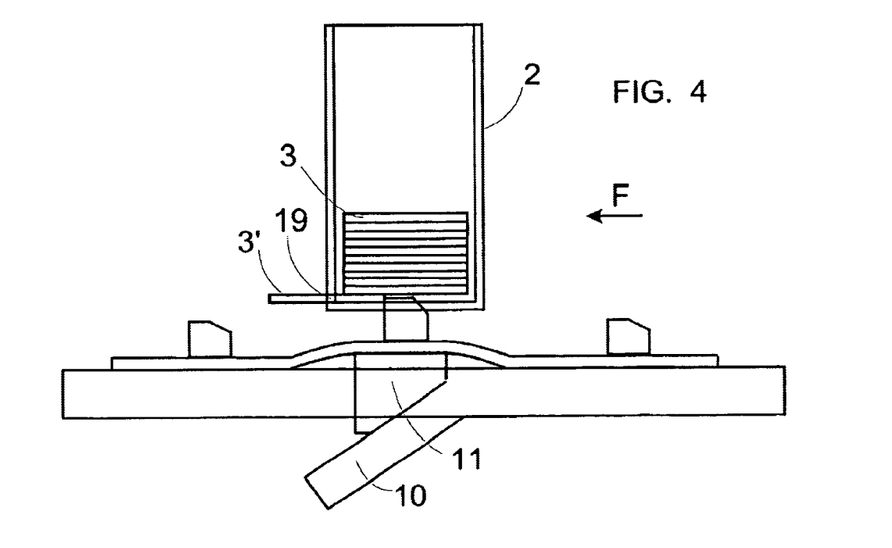
FIG. 4 is a schematic view showing a commissioning device according to FIG. 3 during commissioning.

FIGS. 3 and 4 show other lifting means in the form of an oblique ramp 10 with a wedge-shaped lifting body 11, which are provided under the conveyor belt 4 in the area of an associated product storage unit 2, wherein the lifting body 11, which is displaceable or can be moved by means of rollers, is adjustable in height along the ramp 10 in order to locally raise the product stop including the conveyor belt when commissioning is to be performed.

Figure 5:
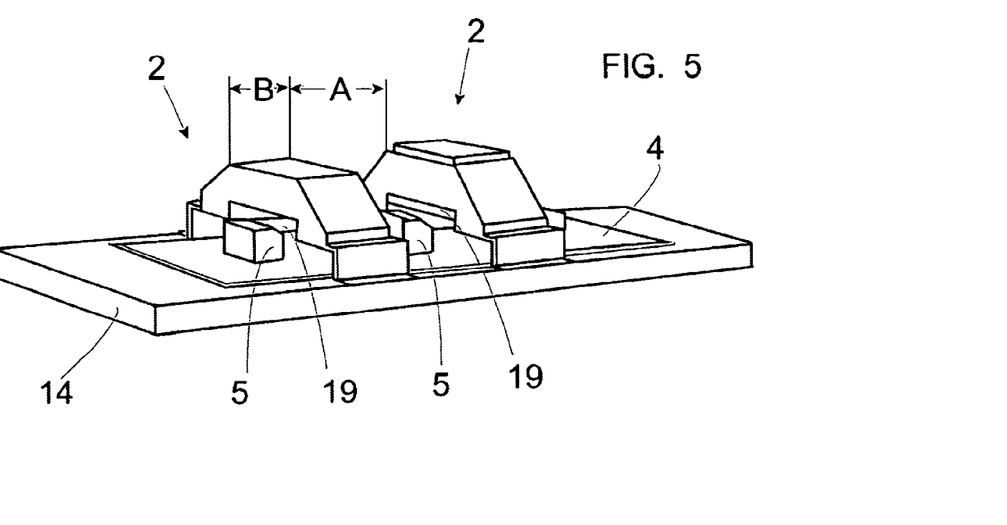
FIG. 5 is a schematic perspective view of the commissioning device according to FIG. 1.
Figure 6:
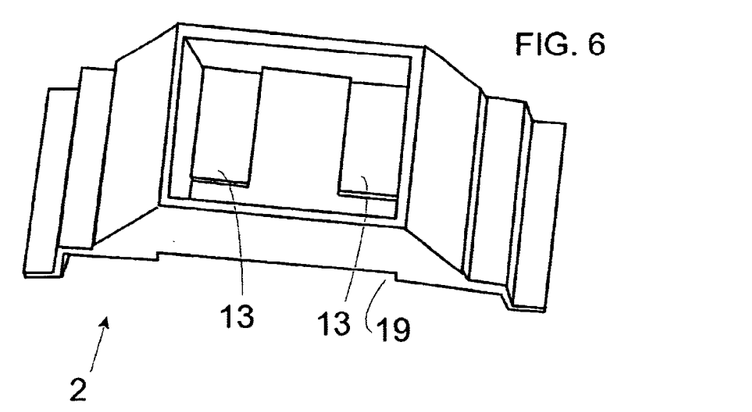
FIG. 6 is an enlarged detail of a product storage unit of the commissioning device according to FIG. 1.
Figure 7:
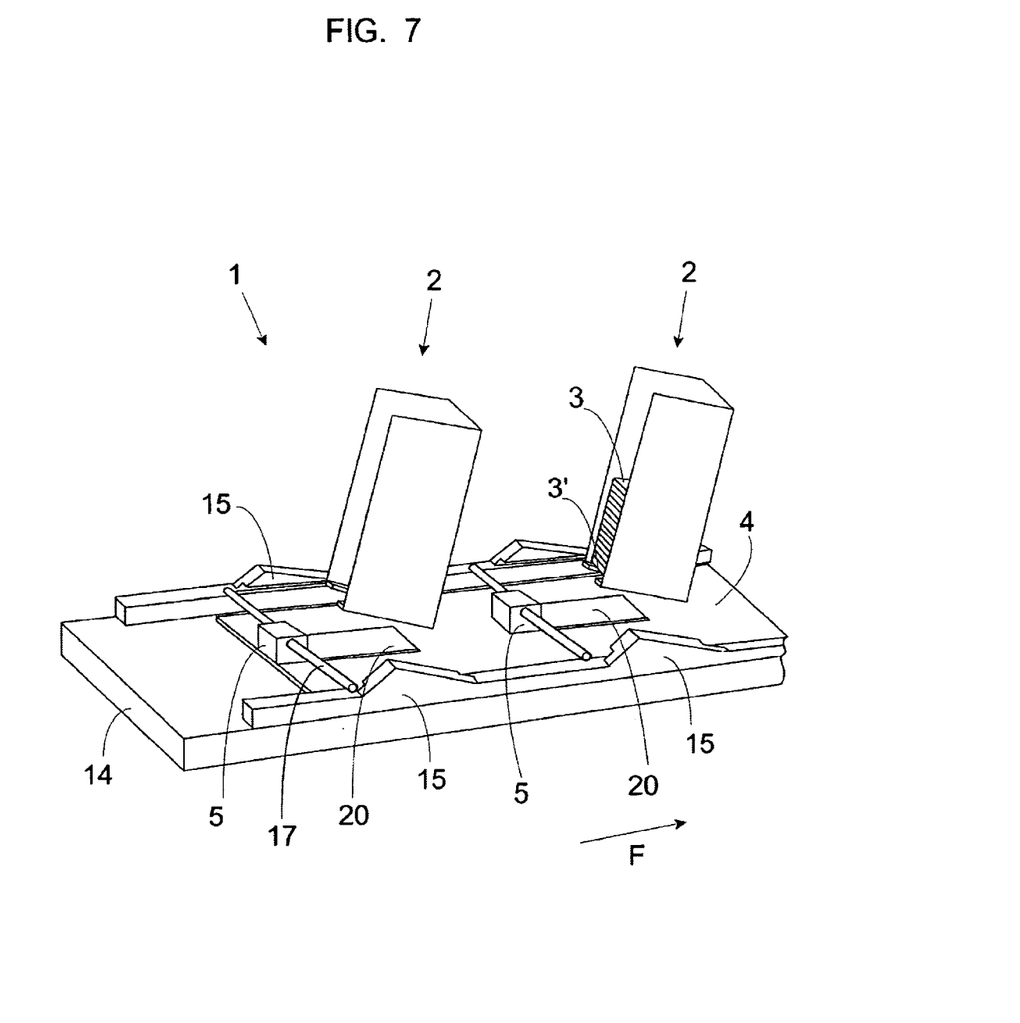
FIG. 7 is a schematic perspective view of another embodiment of the commissioning device with central product stop, tab and lateral ramps.
Figure 8:
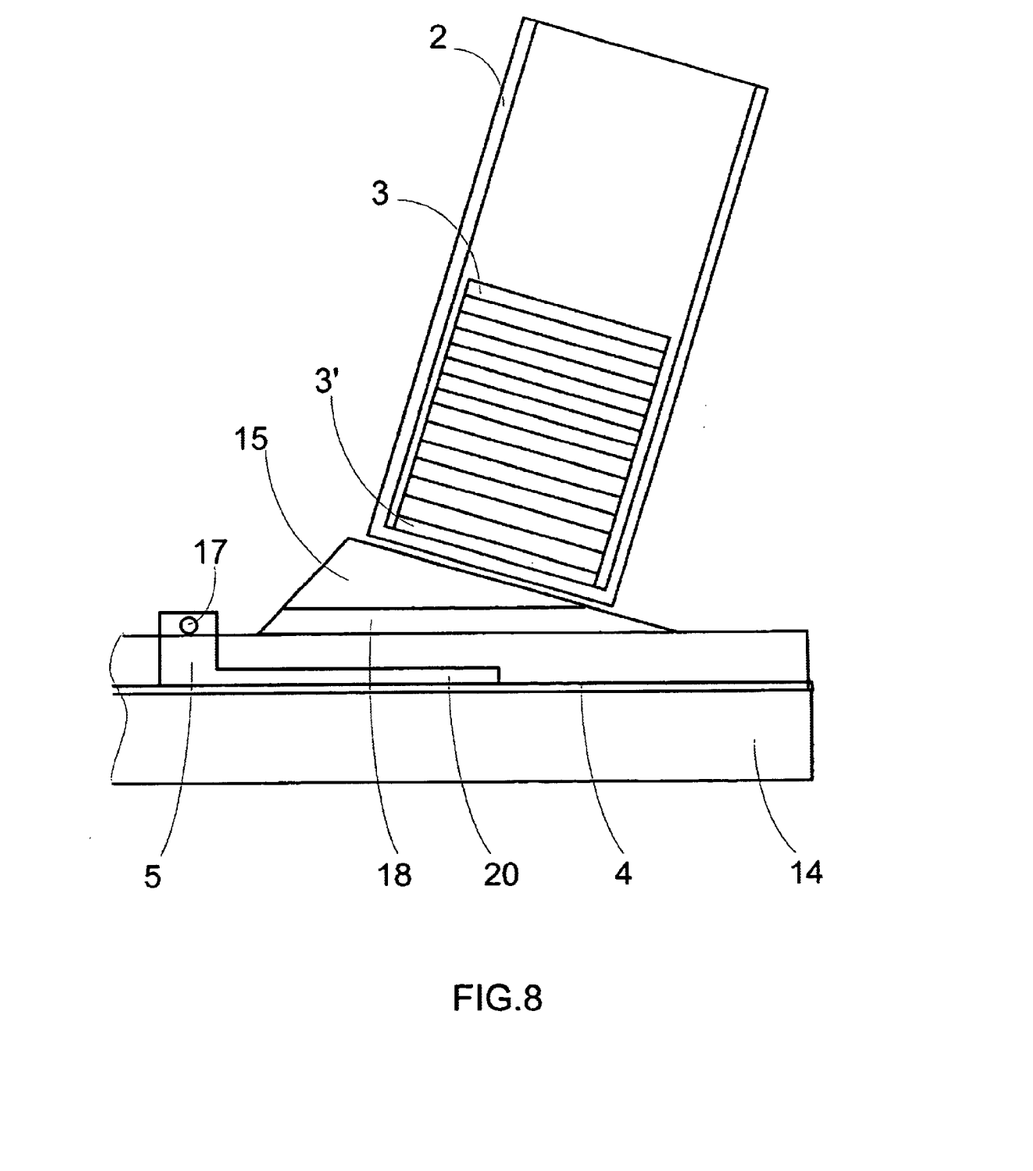
FIG. 8 is a side view of the embodiment according to FIG. 7, with a product stop in front of a product storage unit.
Figure 9:
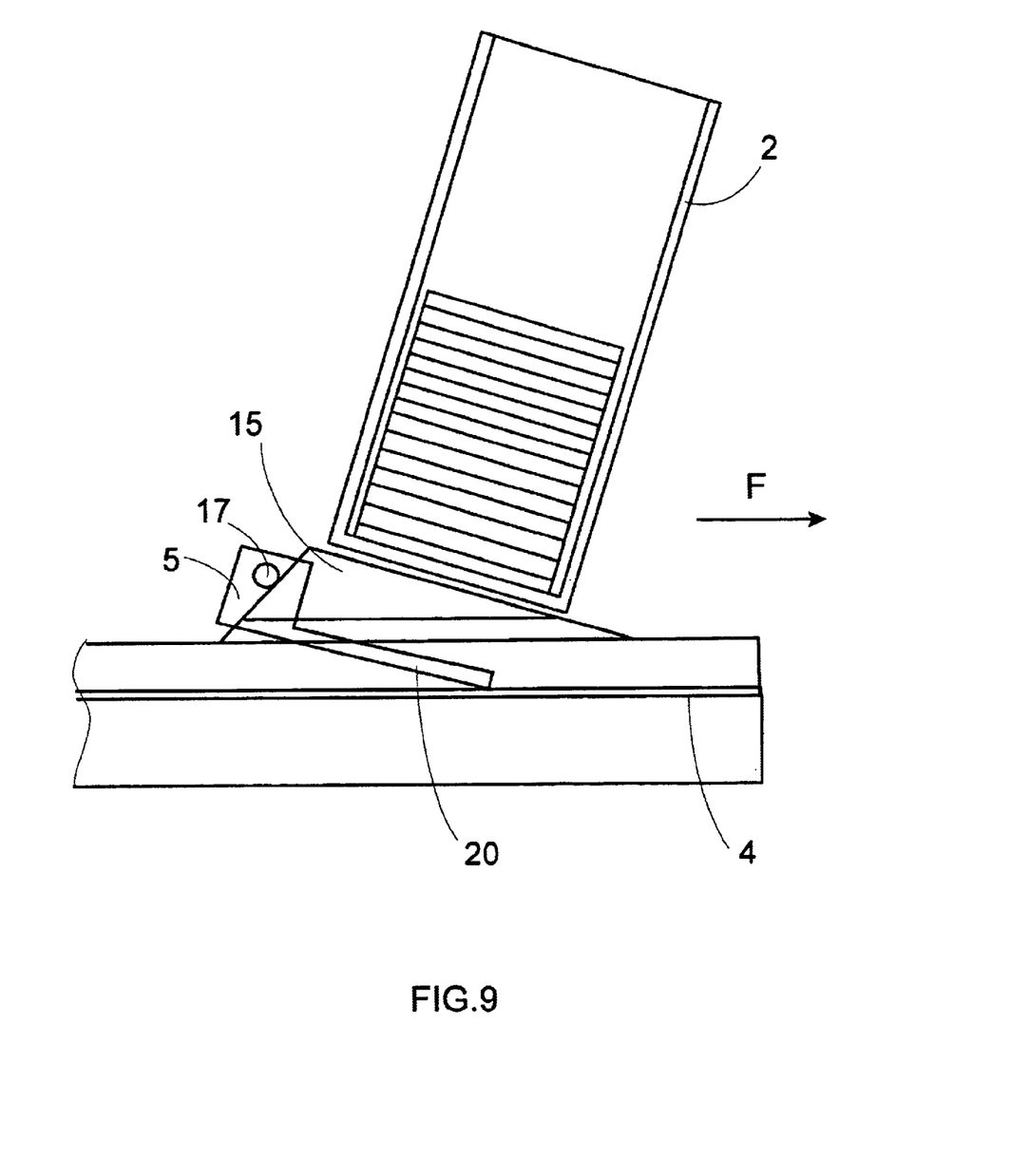
FIG. 9 is a side view of the embodiment according to FIG. 7 with a raised, active product stop during commissioning.
Figure 10:
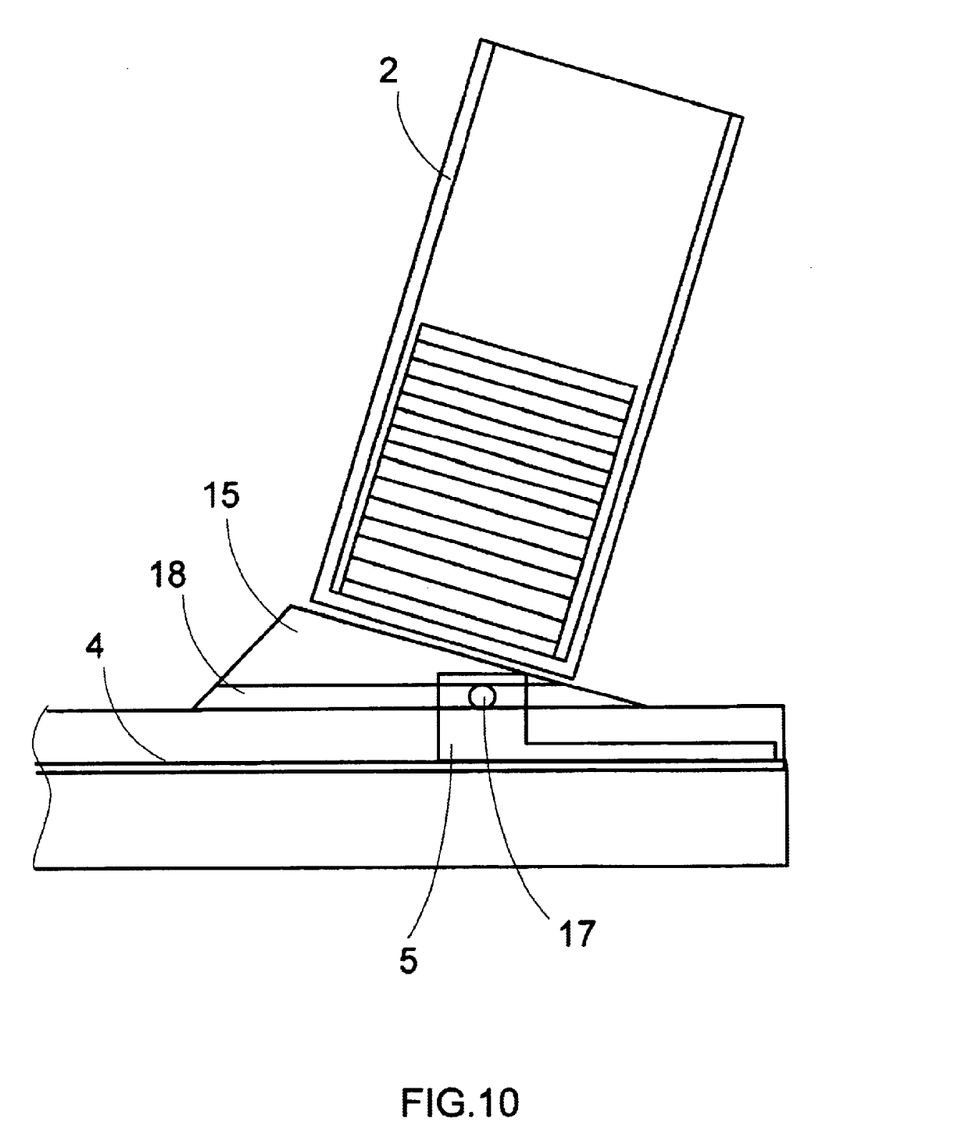
FIG. 10 is a side view of the embodiment according to FIG. 7 with a continuous, inactive product stop during non-commissioning.
Figure 11:
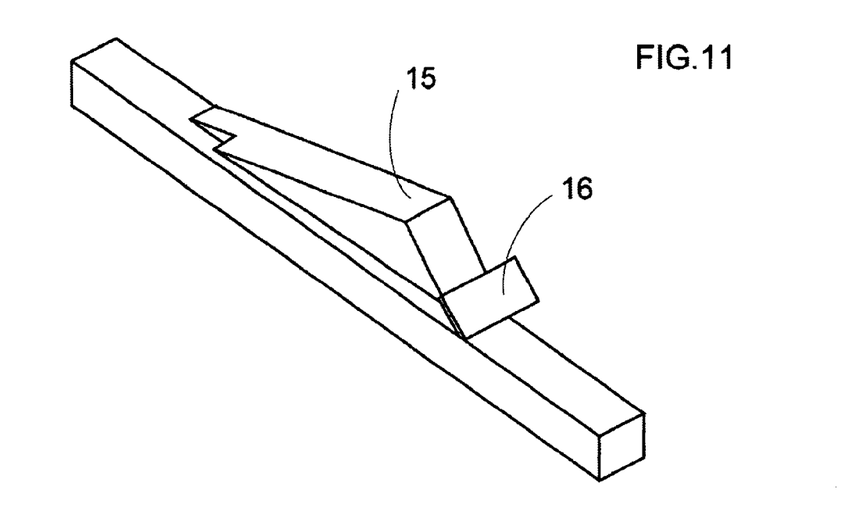
FIG. 11 is a schematic perspective view of a lateral ramp with the switch actuated for adjusting the height of the product stop during the running of the conveyor belt.
Figure 12:
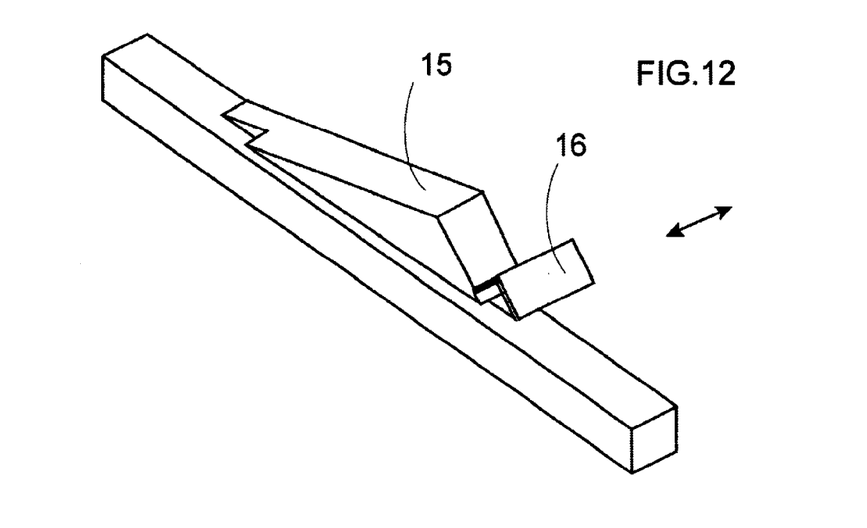
FIG. 12 is a schematic perspective view showing the lateral ramp according to FIG. 11 with the switch not set.

According to FIGS. 5 and 6, the product storage units 2 according to FIGS. 1 through 4 are containers that are open at the top with a square horizontal support. According to the exemplary embodiment, the products 3 are sound-recording media (CDs) in sealed flat cassettes, which are arranged, stacked up on one another, in the product storage unit. The bottom of the product storage units is open in the middle. The CDs are supported on the bottom side in the product storage unit by lateral product rests 13. The distance between two adjacent product stops 5 approximately corresponds to the edge length of a cassette containing a CD.

If the length of the product rest in the product storage unit corresponds to only two thirds of the width of the storage unit, which is especially advantageous, while the remaining outlet-like third is removed on the bottom side, the distance between consecutive product storage units can be reduced to two thirds of the width of the product storage unit, because a product can now fall on the product field of the conveyor belt during pushing out of the product storage unit still without touching the adjacent product storage unit, i.e., already one third sooner than when the product rest occupies the entire width of the storage unit.

FIGS. 7 through 12 show an embodiment of a commissioning device 1, in which the product stop 5 connected to the conveyor belt 4 is raised by lifting means without the conveyor belt directly in front of and after the product 3' of a product storage unit 2, which product is the lowermost product of the stack and is to be commissioned, and is again lowered into the conveyor belt plane 7. In particular, each product stop 5 is connected to the conveyor belt 4 by means of a conveyor belt tab 20, which is subjected to tensile load, and the product stop 5 is adjustable in height by means of lateral stationary ramps 15 in the area of the lateral edge of the conveyor belt. In particular, each product stop 5 arranged in the middle of the conveyor belt has a fixed bar 17, which is arranged at right angles to the conveyor belt and whose lateral ends run over the identically configured lateral ramps 15 to raise the bar including the product stop 5 and then act as carriers for a lowermost product 3' of the stack and push out the product in this manner. According to FIGS. 11 and 12, the lateral ramps 15 have an adjustable, cycled switch 16 each, which is a laterally displaceable ramp part. If the switch is in its active position according to FIG. 11, it acts as a ramp: The bar 17 of the product stop 5 passes through the raised ramp path. If the switch is in its inactive position according to FIG. 12, the lateral groove 18 of each lateral ramp is connected through. The bar 17 passes through each lateral groove 18 without a rise in its level. The product stop 5 correspondingly also remains in its basic position near the conveyor belt. The lowermost product of the stack is then not pushed out according to FIG. 10.

The product storage units 2 are slightly sloped relative to the vertical in the direction of conveying F of the conveyor belt 4 in the exemplary embodiment according to FIGS. 7 through 12 in order to facilitate the pushing out of a lowermost product of the stack. The slope may be preferably selected to be such that the top edge of the product is located under the lower edge of the next product storage unit during the pushing out of a product. Consequently, the product is pushed under the next product storage unit. The distance between the product storage units is now determined by the space requirement for the ascending part of the ramp.

Instead of a central product stop, two lateral product stops 5 of identical design may be used for a single product 3' of a product storage unit 2, which is the lowermost product of the stack, without there being a risk for jamming during the pushing-out operation.

The product storage units 2 of a conveyor belt 4 are arranged mainly in a row and are located at equally spaced locations from one another, and the distance a between the product storage units 2 is smaller than the width b of the product storage unit.

The product storage units 2 may also be slightly sloped relative to the vertical at right angles to the direction of conveying F of the conveyor belt 4 and be, in particular, a vertical, doubly sloped angle sheet iron with a positioning angle for products 3 picked up in the product storage unit 2, so that differently configured cubic products can also be reliably stacked in the angle in an aligned manner. The bottom-side product stops are also guided corresponding to the slopes for commissioning.

The product storage units 2 have a lateral ejection slot 19 located in the direction of conveying F for products 3' to be given out, which said ejection slot may also be adjustable in width in order to push out at least two stacked products simultaneously if the product stop has a corresponding height or if two ramps of different heights are provided for pushing out products in one piece and for pushing out products in two pieces.

Figure 13:
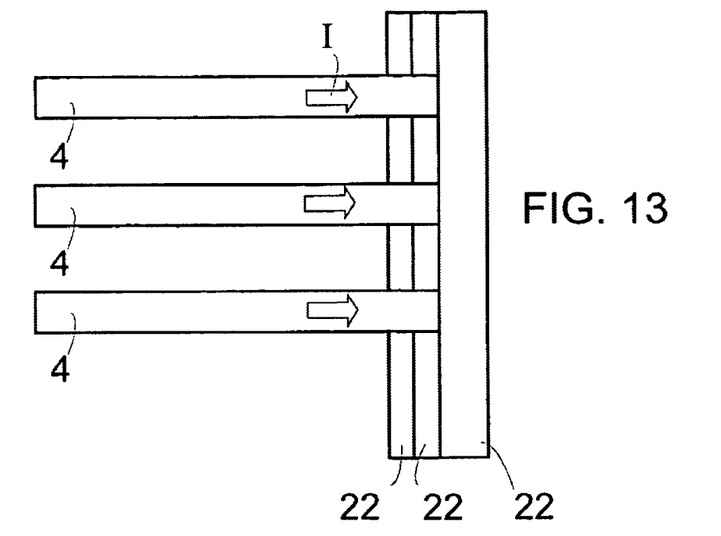
FIG. 13 is a schematic top view of a commissioning device with three conveyor belts located next to one another in a total of three planes.
Figure 14:
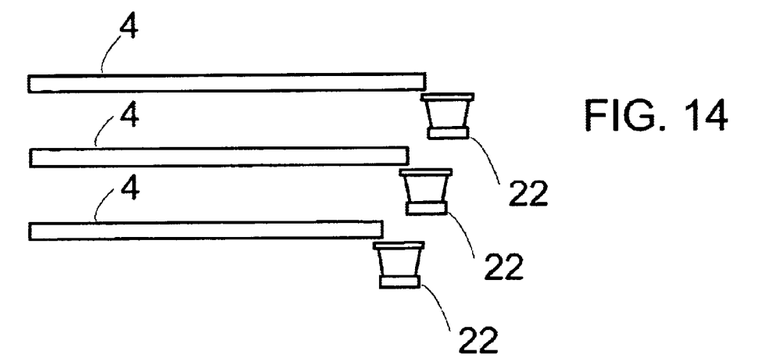
FIG. 14 is a schematic lateral view of the arrangement according to FIG. 13.
Figure 15:
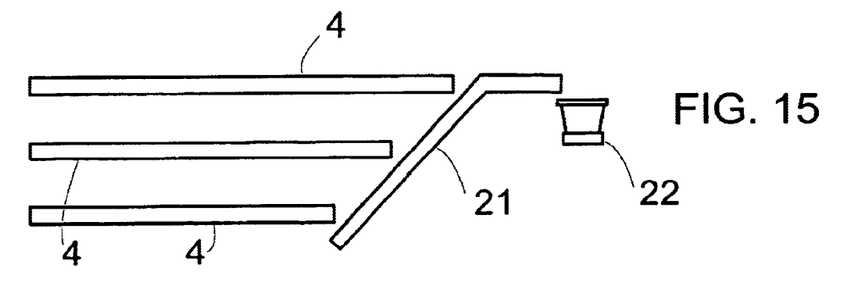
FIG. 15 is a schematic view an arrangement similar to that in FIG. 14, with an intermediate conveyor belt for bridging over different conveyor belt planes and with a similar cross belt for removing commissioned products in containers.

According to FIGS. 13, 14 and 15, a plurality of conveyor belts 4 with associated product storage units 2 are provided in the same plane and/or in different planes, whose conveying end is in connection with a cross belt 22, and oblique intermediate conveyor belts 21, which can be bridged over in height, may be provided.

While specific embodiments of the invention have been shown and described in detail to illustrate the application of the principles of the invention, it will be understood that the invention may be embodied otherwise without departing from such principles.

What is claimed is:

1. A commissioning device, comprising:
   essentially vertical product storage units, in which products of the same type are stored;
   a conveying means, arranged under the product storage units, for removing selected or commissioned products;
   an upwardly directed product stop of the conveying means for pushing the lowermost product of the stack out of the product storage unit in the direction of conveying of the moving conveying means and deposition on a positioned product field of the conveying means, the product storage units being arranged lying over a conveying means plane at equally spaced locations therefrom; and
   a lifting means wherein the product stop of the moving conveying means passes freely through under the product storage unit during the non-commissioning of a product that is the lowermost product of the stack and is raised by said lifting means for lateral engagement with at least one product which is the lowermost product of the stack during commissioning.

2. A commissioning device in accordance with claim 1, wherein two lateral product stops of identical design are provided for a single product of a product storage unit, which product is the lowermost product of the stack.

3. A commissioning device in accordance with claim 1, wherein the product storage units are sloped relative to vertical in the direction of conveying of the conveying means.

4. A commissioning device in accordance with claim 1, wherein the product storage units of the conveying means are arranged in a row at equally spaced locations and the distance between the product storage units is smaller than the width of the product storage unit.

5. A commissioning device in accordance with claim 1, wherein a plurality of said conveying means are provided with associated product storage units in the same plane and/or in different places, whose conveying ends are in connection with cross conveyors, wherein oblique intermediate conveying means, which can be bridged over in height, especially said intermediate conveyor belts are provided.

6. A commissioning device in accordance with claim 1, wherein one or more said product storage units are designed as a drawer or roller-mounted drawer displaceable at right angles to the conveying means.

7. A commissioning device in accordance with claim 1, wherein a plurality of pushed-out products of one or more said product storage units can be stacked in a single product field.

8. A commissioning device in accordance with claim 1, wherein the product storage units are sloped relative to the vertical at right angles to the direction of conveying of the conveying means.

9. A commissioning device in accordance with claim 8, wherein the product storage unit is a vertical, doubly sloped angle sheet iron with a positioning angle for the products picked up in the product storage unit.

10. A commissioning device in accordance with claim 1, wherein the product storage units have a lateral ejection slot located in the direction of conveying for products to be given out.

11. A commissioning device in accordance with claim 10, wherein the lateral ejection slot, adjustable in width in the vertical direction, is provided with a top-side brush or with a top-side downwardly adjustable plate slide, for the uniform ejection of at least two stacked products from a single product storage unit.

12. A commissioning device in accordance with claim 1, wherein the conveying means is raised by the lifting means together with the product stop, which is rigidly connected to the conveying means, directly in front of and after the product of a product storage unit, which product is the lowermost product of the stack and is to be commissioned, and is again lowered into the conveying means plane.

13. A commissioning device in accordance with claim 12 wherein the lifting means are a cycled, vertical lifting drive, which is provided under the conveying means in the area of a said associated product storage unit and is operated pneumatically or electrically.

14. A commissioning device in accordance with claim 13, wherein the lifting means has an oblique ramp with a wedge-shaped lifting body provided under the conveyor belt in the area of a associated product storage unit, and the lifting body, which is displaceable or can be moved by means of rollers, is adjustable in height along the ramp.

15. A commissioning device in accordance with claim 1, wherein the product stop, which is connected to the conveying means, is raised by the lifting means without the conveying means directly in front of and after the product of a product storage unit, to the product which is the lowermost product of the stack and is to be commissioned, and is again lowered to the conveyor means plane.

16. A commissioning device in accordance with claim 15, wherein the product stop is connected to the conveying means by means of a conveying means tab, which is subjected to tensile load, and the product stop is adjustable in height by means of lateral stationary ramps in the area of the lateral edge of the conveying means or by a means arranged above the conveying means at the product storage unit.

17. A commissioning device in accordance with claim 16, wherein the lateral ramps have an adjustable, cycled switch each, which is preferably a laterally displaceable ramp part.

* * * * *